US008781192B2

(12) United States Patent
Lamash et al.

(10) Patent No.: US 8,781,192 B2
(45) Date of Patent: Jul. 15, 2014

(54) TISSUE CLASSIFICATION

(75) Inventors: Yechiel Lamash, Haifa (IL); Jonathan Lessick, Haifa (IL); Asher Gringauz, Nesher (IL)

(73) Assignee: Koninklijke Philips N.V., Eindhoven (NL)

( * ) Notice: Subject to any disclaimer, the term of this patent is extended or adjusted under 35 U.S.C. 154(b) by 104 days.

(21) Appl. No.: 13/702,136

(22) PCT Filed: Apr. 27, 2011

(86) PCT No.: PCT/IB2011/051845
§ 371 (c)(1), (2), (4) Date: Dec. 5, 2012

(87) PCT Pub. No.: WO2011/158135
PCT Pub. Date: Dec. 22, 2011

(65) Prior Publication Data

US 2013/0077838 A1 Mar. 28, 2013

Related U.S. Application Data

(60) Provisional application No. 61/354,291, filed on Jun. 14, 2010.

(51) Int. Cl.

| | |
|---|---|
| ***G06K 9/00*** | (2006.01) |
| ***G06K 9/46*** | (2006.01) |
| ***G06T 7/40*** | (2006.01) |
| ***G06T 7/00*** | (2006.01) |
| *A61B 5/00* | (2006.01) |

(52) U.S. Cl.
CPC ........ *G06K 9/00536* (2013.01); *G06K 2209/05* (2013.01); *G06K 9/4647* (2013.01); *G06T 2207/30048* (2013.01); *G06T 7/401* (2013.01); *G06T 2207/10072* (2013.01); *G06T 7/0012* (2013.01)
USPC ............................ 382/128; 382/285; 600/334

(58) Field of Classification Search
USPC ......... 382/100, 103, 106–107, 128–134, 154, 382/162, 168, 173, 181, 224, 232, 254, 382/274–276, 285, 291, 305, 312; 600/407, 600/425, 300, 334; 378/4, 21
See application file for complete search history.

(56) References Cited

U.S. PATENT DOCUMENTS 6,248,063 B1 * 6/2001 Barnhill et al. ............... 600/300
7,912,528 B2 * 3/2011 Krishnan et al. ............. 600/407

(Continued)

FOREIGN PATENT DOCUMENTS

WO 2004032021 A1 4/2004
WO 2008155718 A2 12/2008
WO 2009088370 A1 7/2009

OTHER PUBLICATIONS

Huang et al, A fast two-dimensional median filtering algorithm, IEEE transactions on Acoustics, Speech and Signal Processing, Feb. 1979, vol. ASSP 27, No. 1.

(Continued)

*Primary Examiner* — Seyed Azarian

(57) ABSTRACT

A method for classifying tissue as normal or abnormal tissue includes obtaining segmented reconstructed volumetric image data for predetermined tissue of interest, generating a 2D voxel representation of the segmented reconstructed volumetric image data, and classifying voxels of the segmented reconstructed volumetric image data as corresponding to abnormal and normal tissue based on the 2D voxel representation.

17 Claims, 3 Drawing Sheets

100
102
104
106
108
110
112 RECONSTRUCTOR
114
116 CONSOLE
118 SEGMENTOR
120 TISSUE CLASSIFIER
Z

(56) References Cited

U.S. PATENT DOCUMENTS

| | | | | |
|---|---|---|---|---|
| 2009/0190811 | A1* | 7/2009 | Zheng et al. | 382/128 |
| 2009/0290778 | A1* | 11/2009 | Sun et al. | 382/131 |
| 2011/0082368 | A1* | 4/2011 | Botterweck | 600/425 |

OTHER PUBLICATIONS

Hicks et al., Automated quantitation of three-dimensional cardiac positron emission tomography for routine clinical use, J Nucl Med. Nov. 1989, 1787-97, vol. 30, No. 11.

Leventon et al., Level Set Based Segmentation with Intensity and Curvature Priors, IEEE Workshop on Mathematical Methods in Biomedical Image Analysis, 2000; pp. mmbia00-1.pdf; Abstract; Section2.1; Fig.3; Fig.4.

De Sutter et al., Automatic quantification of defect size using normal templates: a comparative clinical study of three commercially available algorithms, Eur J Nucl Med., Dec. 2000, pp. 1827-1834, vol. 27, No. 12.

Itti et al., Assessment of myocardial reperfusion after myocardial infarction using automatic 3-dimensional quantification and template matching, J Nucl Med., Dec. 2004, pp. 1981-1988, vol. 45, No. 12.

Ecabert et al., Modeling Shape variability for full heart segmentation in cardiac computed-tomography images, Medical imaging, 2006.

Lorenz et al., A comprehensive shape model of the heart, Medical image analysis, 2006.

Hsu et al., Quantitative myocardial infarction on delayed enhancement MRI. Part I: Animal validation of an automated feature analysis and combined thresholding infarct sizing algorithm, J Magn Reson Imaging, Mar. 2006, pp. 298-308, vol. 23, No. 3.

George et al., Adenosine Stress 64- and 256-Row Detector Computed Tomography Angiography and Perfusion Imaging: A Pilot Study Evaluating the Transmural Extent of Perfusion Abnormalities to Predict Atherosclerosis Causing Myocardial Ischemia, Circ Cardiovasc Imaging, 2009,pp. 174-182, vol. 2.

Kachenoura et al., Value of multidetector computed tomography evaluation of myocardial perfusion in the assessment of ischemic heart disease: comparison with nuclear perfusion imaging, Eur. Radiol., Aug. 2009, pp. 1897-1905, vol. 19 No. 8.

Kachenoura et al., Volumetric quantification of myocardial perfusion using analysis of multi-detector computed tomography 3D datasets: comparison with nuclear perfusion imaging, Eur Radiol., Feb. 2010 pp. 337-347, vol. 20, No. 2.

Breeuwer, M., et al.; Analysis of volumetric cardiac CT and MR image data; 2003; Medicamundi; Philips Medical Systems; 47(2)41-53.

Ciofolo, C., et al.; Segmentation of Pathologic Hearts in Long-Axis Late-Enhancement MRI; 2008; Medical Image Computing and Computer-Assisted Intervention; vol. 5241; pp. 186-193.

Gordon, S., et al.; Image Segmentation of Uterine Cervix Images for Indexing in PACS; 2004; Computer-Based Medical Systems; pp. 298-303.

* cited by examiner

TISSUE CLASSIFICATION

CROSS REFERENCE TO RELATED APPLICATIONS

This application is a national filing of PCT application Serial No. PCT/IB2011/051845, filed Apr. 27, 2011, published as WO2011/158135A1 on Dec. 22, 2011, which claims the benefit of U.S. provisional application Ser. No. 61/354,291 filed Jun. 14, 2010, which is incorporated herein by reference.

The following generally relates to classifying regional tissue as abnormal or normal based on volumetric image data and is described with particular application to computed tomography (CT); however, other imaging applications such as MRI, PET, SPECT, and/or other imaging modalities are also contemplated herein.

Coronary artery disease, one of the major causes of morbidity and mortality, often manifests as myocardial infarction or ischemia. The size and severity of these defects are among the major determinants of prognosis in this disease. Multi Slice Computed Tomography (MSCT) can be used for non-invasive imaging for visualization and assessment of coronary heart disease. However, MSCT does not provide information regarding the functional significance of coronary stenosis. Perfusion defect and infarct size are currently acquired with a variety of resources such as echocardiography and single photon emission computed tomography (SPECT) myocardial perfusion imaging (MPI).

The literature has shown that intramyocardial distribution of contrast during the arterial phase of enhancement is related to myocardial perfusion. However, the visualization of these hypoenhanced areas is operator-dependent and requires manipulation of the image windowing. Estimation of the infarction extent requires further manual scrolling and marking across adjacent slices. The literature has also revealed various attempts to perform automatic quantification of perfusion defects using SPECT or PET images with simple threshold based methods compared to a normal population and delayed enhancement images to measure myocardial infarct size based on automated feature analysis and combined thresholding.

Existing methods mainly use simple voxel classification based on CT-numbers in the myocardium, which may be normalized by dividing by left ventricular cavity values, by values in normal segments in the same heart or by normal values for a particular region based on normal studies. One study normalizes by calculating a subendocardial to subepicardial ratio, based on evidence that the subendocardium is more susceptible to injury. The literature provides a description of objective 3D quantification of perfusion defects based on histogram analysis and comparison with normal values and measured transmural perfusion through a ratio of subendocardial to subepicardial voxel densities. Unfortunately, no fully automatic methods have been disclosed or exist for CT.

Aspects of the present application address the above-referenced matters and others.

According to one aspect, a method for classifying tissue as normal or abnormal tissue includes obtaining segmented reconstructed volumetric image data for predetermined tissue of interest, generating a 2D voxel representation of the segmented reconstructed volumetric image data, and classifying voxels of the segmented reconstructed volumetric image data as corresponding to abnormal and normal tissue based on the 2D voxel representation.

According to another aspect, a system includes a tissue classifier that generates a 2D voxel representation of reconstructed volumetric image data and classifies voxels of the reconstructed volumetric image data as corresponding to abnormal and normal tissue based on the 2D voxel representation.

According to another aspect, a computer readable storage medium encoded with instructions which, when executed by a processor of a computer, cause the processor to: classify tissue as normal and abnormal based on a classification of voxels of volumetric image data corresponding to the tissue, wherein the classification is based on an analysis of a 2D representation-voxels, which includes de-noised voxels and normalized voxel distances.

The invention may take form in various components and arrangements of components, and in various steps and arrangements of steps. The drawings are only for purposes of illustrating the preferred embodiments and are not to be construed as limiting the invention.

Figure 1:
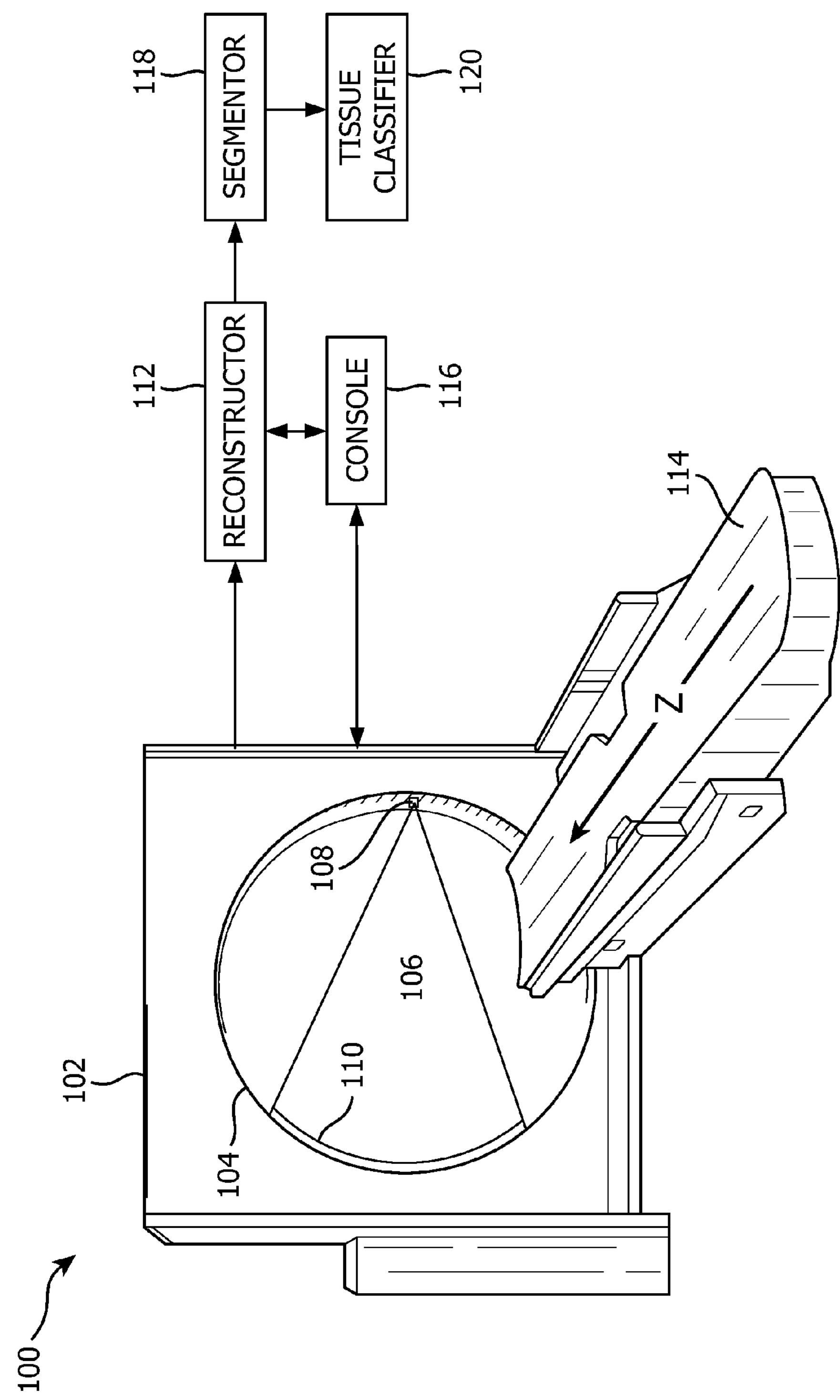
FIG. 1 illustrates an imaging system in connection with a tissue classifier.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis.

A radiation source 108, such as an x-ray tube, is supported by the rotating gantry 104 and rotates with the rotating gantry 104, and emits radiation. A radiation sensitive detector array 110 located opposite the source 108 detects radiation that traverses the examination region 106 and generates projection data indicative thereof.

A reconstructor 112 reconstructs projection data and generates volumetric image data indicative of the examination region 106. A support 114, such as a couch, supports a subject in the examination region 106. The support 114 can be used to variously position the subject with respect to x, y, and/or z axes before, during and/or after scanning.

A general purpose computing system serves as an operator console 116, which includes human readable output devices such as a display and/or printer and input devices such as a keyboard and/or mouse. Software resident on the console 116 allows the operator to control the operation of the system 100.

A segmentor 118 is used to variously segment the volumetric image data. By way of non-limiting example, in the context of a cardiac application, the segmentation may include the segmentation of the myocardial voxels from the volumetric image data. The segmentation may be automatic, semi-automatic (with partial user interaction), or manual (with user interaction).

A tissue classifier 120 classifies at least a sub-portion of the segmented image data. In one instance, the classification includes classifying voxels (and hence the tissue represented in the segmented image data) as normal or abnormal tissue. As described in greater detail below, in one embodiment, the tissue classifier 120 employs a classification algorithm that is based on a multi-dimensional histogram to classify tissue as normal or abnormal. In the context of a cardiac application, in one embodiment the 2D representation is based on voxel de-noised CT numbers and voxel normalized distances from the endocardium, and the classification takes into account the gradient (appearance) of CT numbers in the transmural direction.

It is to be appreciated that the tissue classifier 120 may be part of the system 100 (as shown) or remote therefrom, for example, in a computing system such as a workstation or the like. In either instance, one or more processors may execute computer readable instructions encoded and/or embodied on local or remote computer readable storage medium such as memory to implement the tissue classifier 120.

Figure 2:
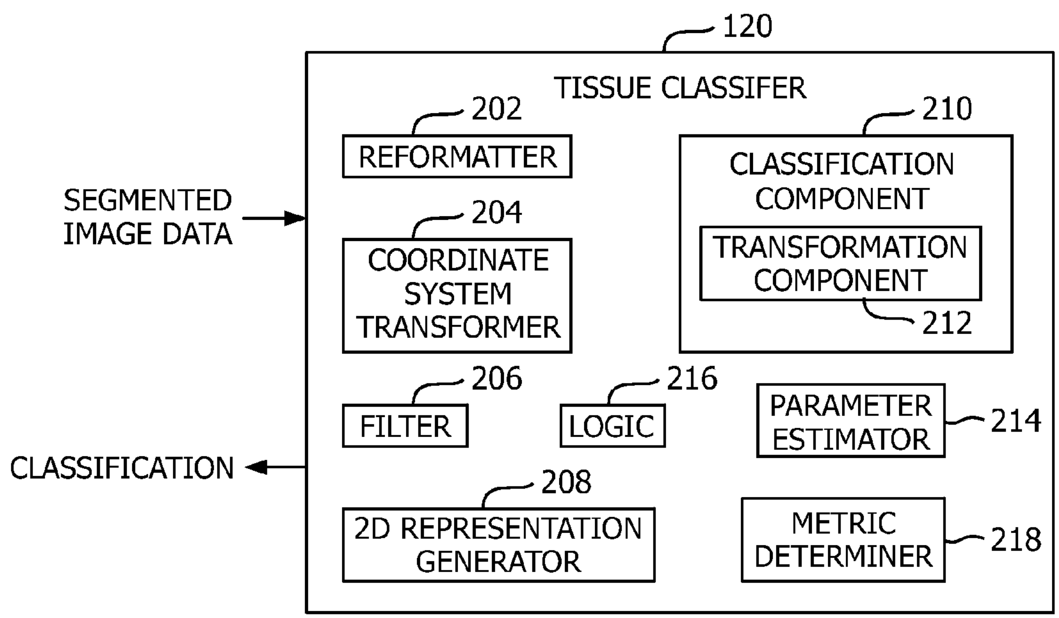
FIG. 2 illustrates an example tissue classifier.

FIG. 2 illustrates an example tissue classifier 120. For sake of clarity and explanatory purposes, the example tissue classifier 120 is described in connection with a cardiac application. However, other applications are also contemplated herein. As shown, the tissue classifier 120 receives segmented image data, which may have been segmented by the segmentor 118 or otherwise.

A reformatter 202 can be used to reformat the segmented image data. Generally, the original segmented image data is formed from slices along the long axis of the subject. In the context of the cardiac example, in one instance the reformatter 202 identifies the long axis of heart in the segmented image data, identifies the short axis of the heart based on the long axis (e.g., the axis perpendicular to the long axis), and reformats the segmented image data along the short axis of the heart. In other words, the reformatter 202 transforms (e.g., rotates and/or translates) the data to the heart axis coordinate system. Where the segmented image data is already in a suitable format, the reformatter 202 can be omitted.

A coordinate system transformer 204 transforms the reformatted data into a suitable coordinate system, if the reformatted data is not already in a suitable coordinate system. For example, where the coordinate system of interest is a cylindrical coordinate system and the reformatted data is in another coordinate system such as a rectangular coordinate system, the coordinate system transformer 204 transforms the reformatted data into the cylindrical coordinate system. Coordinate transformations between other coordinate systems are also contemplated herein. Where the segmented image data is already in a suitable coordinate system, the coordinate system transformer 204 can be omitted.

A filter 206 can be used to filter the transformed image data. In one instance, the filtering includes edge preserved denoising, which facilitates distinguishing tissue types in the image data. An example of a suitable fast edge preserved de-noising filter is a two-dimensional median filter. This filter smoothes the image data at circumferential and radial orientations while preserving edges. In this cardiac example, the image data is re-formatted to align the heart muscle by mapping the endocardial border into a straight line prior to filtering. In another embodiment, the filter 206 is omitted.

A 2D voxel representation generator 208 generates a 2D histogram from the filtered image data. In the subject cardiac example, the 2D representation can represent voxels in the data of the myocardium using various values such as a voxel de-noised gray level, obtained by the edge preserving image filtering (e.g., by filter 206 or otherwise), and a voxel normalized distance from the endocardium. Such a 2D representation can be described through EQUATION 1:

$$Y = \begin{pmatrix} X' \\ D \end{pmatrix}, \qquad \text{EQUATION 1}$$

wherein Y represents the two dimensional voxel representation, X' represents the de-noised voxel CT number, and D represents the voxel normalized distance from the endocardium.

A classification component 210 classifies voxels, and hence the tissue represented thereby, based on the 2D voxel representation. The classification component 210 can use various algorithms to classify the voxels in the two-dimensional space, at a reduced subspace (e.g., based on principle component analysis), or otherwise. In the following example, a reduced subspace approach based on principle component analysis is utilized.

For this approach, a transformation component 212 processes the 2D histogram. In the illustrated embodiment, the data transformation component 212 is configured to perform a principle component analysis (PCA) on the 2D representation. The PCA is applied using the normal voxels only. In one instance, since the normal voxels may not be known a priori, it is assumed that most of the myocardial voxels are normal, and the voxels with the values that are close to the 2D histogram's ridge are taken.

The resulting histogram includes several main modes for materials such as fat, normal muscle, ischemic muscle, and over enhanced tissue (e.g., due to blood and image artifacts). The relative location of the different modes depends on the concentration and distribution of the iodine in the blood and differs from one patient to the other. One approach to finding thresholds for segmenting abnormal regions is based on probabilistic tissue modeling in which a voxel is classified according to its maximum a-posteriori probability (MAP) to belong to a normal or abnormal tissue segment.

With this approach, the data is treated as samples of a mixture of random variables with a certain distribution. A suitable mixture model includes a Gaussian mixture model. Such a mixture model assumes that the data distribution is represented as the summation of several Gaussians. In this example, the distribution is determined based on a mixture of four Gaussians, which correspond to the above-noted tissues: fat, abnormal tissue (ischemia), normal tissue, and over-enhanced tissue. Other models and threshold techniques for classifying abnormal and normal tissues may alternatively be used.

The parameters of the model include:

$$p(j \mid x) = \sum_{j=1}^{K} p(x \mid j) P(j)$$

$$p(x \mid j) = \frac{1}{2\pi |\Sigma_j|^{1/2}} \exp\left( -\frac{1}{2} (x - \mu_j)^T \sum_j^{-1} (x - \mu_j) \right)$$

wherein x is a gray level voxel value, j is a class (fat, abnormal tissue, normal tissue and over-enhanced tissue), p(j|x) is the a-posteriori probability density function, p(x|j) is the conditional probability density function of x belonging to class j, P(j) is the prior probability to belong to class j, $\mu_j$ is the mean of class j, and $\Sigma_j$ is the covariance matrix of class j.

Based on the above, a classification can be described through EQUATION 2:

$$LiklihoodRatio = \frac{p(Y' \mid \text{Normal}) P(\text{Normal})}{p(Y' \mid \text{Abnormal}) P(\text{Abnormal})}, \qquad \text{EQUATION 2}$$

wherein p(Y'|Normal) and p(Y'|Abnormal) are conditional probability density functions, P(Normal) and P(Abnormal) are the priors, and $Y' = V^T \cdot Y$, where Y' represents the one-dimensional voxel value after transforming to the first principle of the normal voxels and V is the Eigen vector of the first principle component.

A parameter estimator 214 which include a numerical non-linear optimization solver can be used to estimate the model parameters.

In one non-limiting embodiment, the logic 216 performs the fitting to the probability density function using a Genetic Algorithm (GA) optimization or other nonlinear optimization technique. Given a specific optimization problem, a typical GA, searches for the optimal solution by first defining an initial population of potential solutions called chromosomes and then subsequently evaluating each chromosome using a pre-defined fitness function. The fitness scores are used in creating a new population (generation) using three genetic operators of recombination, crossover and mutation. This process of creating a new population from the old one iterates until a pre-defined termination condition is satisfied. Other approaches are also contemplated herein.

Figure 3:
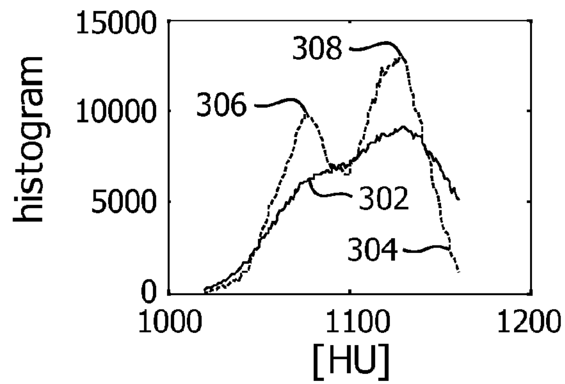
FIG. 3 illustrates example histograms of abnormal myocardium, before and after the processing of 2D voxel representation.
Figure 4:
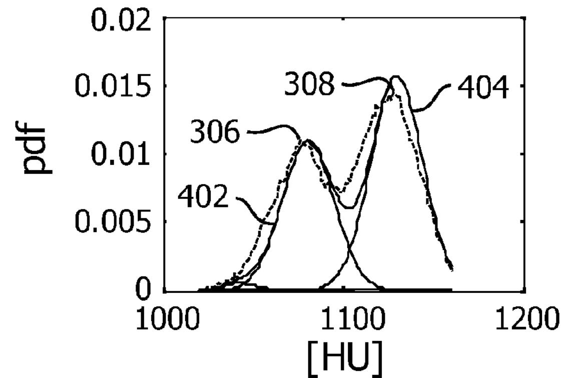
FIG. 4 illustrates an example of a Gaussians mixture model fitting to the processed histogram of FIG. 3.
Figure 5:
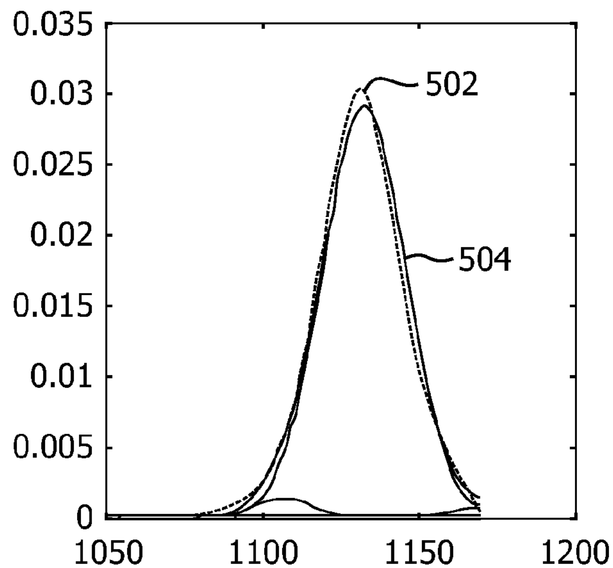
FIG. 5 illustrates a fitted histogram for normal myocardium.

FIGS. 3, 4, and 5 show the results of the above approach. FIG. 3 shows a first unprocessed histogram 302 of an abnormal myocardium, and a second histogram 304 of the abnormal myocardium after the above PCA processing. Note that the first histogram 302 does not have distinct peaks while the second histogram 304 includes distinct peaks 306 and 308. FIG. 4 shows a fitting of the distinct peaks 306 and 308 to Gaussian mixture models 402 and 404. Note that the fitting clearly shows the presence of both abnormal and normal tissue as there are two distinct curves 402 and 404 instead of just a single curve as there would be if all the tissue were normal tissue, as shown in FIG. 5, which shows a histogram 502 of normal myocardium after the above PCA processing and a fitting of the histogram 502 to a single Gaussian mixture model 504. Note that the histogram 502 generally has a single narrow and symmetric shape, unlike the histogram 302 of FIG. 3, which neither narrow nor symmetric. The classification component 120 uses these histograms identify and distinguish abnormal tissue from normal tissue.

Returning to FIG. 2, a metric determiner 218 generates various maps such as polar maps, overlay, and/or other maps. In one instance, the metric determiner 218 determines a metric indicative of the percentage of voxels with gray level below a maximum a-posteriori probability (MAP) threshold along radial ray crossing the muscle. Overlays showing such information can be superimposed over the image voxels according to the probability of being normal or abnormal. The overlay provides a measure of the likelihood ratio (to be normal/abnormal) taken in a logarithmic domain. This metric is well suited for separating healthy and ischemic tissue, for example, since a large percentage of the voxels will have low values.

In another instance, the metric determiner 218 determines a metric indicative of the transmural gradient from the subendocardium to the subepicardium. Generally, normal myocardium typically has a negative slope and true perfusion defects usually have a positive slope (e.g., since the subendocardial regions are always affected first by ischemia). This metric provides a measure of the slope of the Hounsfield values through the radial thickness of the ventricular wall, or the difference in the enhancement of the subendocardial compared to the subepicardial segments along radial rays crossing the muscle. This metric yields good separation between dark artifacts and real ischemic tissue, for example, since artifacts do not tend to have such a difference between the subendocardial and subepicardial tissues.

The classification component 210 can use one or both of the above-described metrics, and/or optionally one or more other metrics, for determining optimal separation between healthy and ischemic tissue and between ischemic tissue and image artifacts. This allows the classification component 210 to identify each radial ray crossing the muscle as normal or abnormal according to the percentage of abnormal voxels and by its subendocardial to subepicardial voxel density difference, such as through a weighted combination of these factors to determine the likelihood of abnormality. The transmural density difference should be close to zero for a normal region or for a transmural defect, and a value below zero indicates a perfusion defect whereas a value above zero suggests an artifact.

Figure 6:
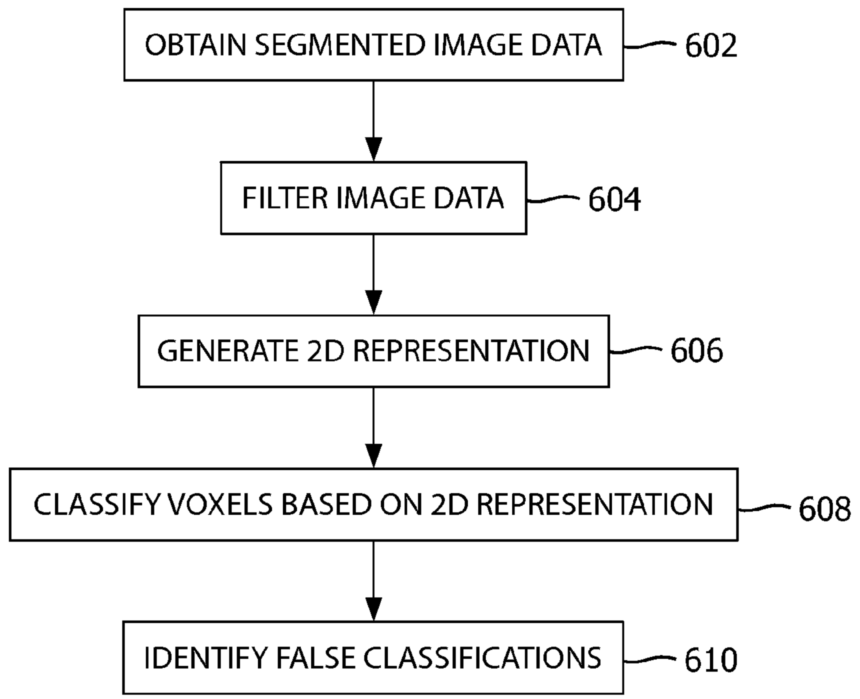
FIG. 6 illustrates an example method for classifying regional tissue.

FIG. 6 illustrates a method for identifying normal and/or abnormal tissue. For explanatory purposes, the method is described in connection with cardiac data and quantifying myocardial perfusion defects or infarction from volumetric images data of the heart.

At 602, segmented volumetric image data is obtained. In this example, the segmented data includes segmentation of the myocardial voxels from the 3D volume.

At 604, the segmented volumetric image data is filtered. In one instance, this applying an edge-preserving de-noising filter. Such a filter can enhance regional differences in voxel values, which may enhance the separation between normal and abnormal voxels.

At 606, a two-dimensional voxel representation is generated for the segmented image data. In one instance, each voxel (or a subset of voxels) in the myocardium is represented through a voxel de-noised CT number (obtained from the filter image data) and a voxel normalized distance from the endocardium. The normalization factor can be the myocardium width or other distance.

At 608, the voxels are classified as normal or abnormal tissue. In one instance, this is achieved by applying a dimension reduction such as a principle component analysis (PCA). In another instance, voxel classification can be performed in the higher dimensional space or otherwise.

At 610, false classifications are identified. This can be done through a second pass in the spatial domain using Hounsfield gradients to differentiate between true defects and artifacts. For cardiac application, it is noted that normal myocardium typically has a negative slope, whereas true perfusion defects usually have a positive slope since the subendocardial regions are affected first by ischemia. In another embodiment, this act is omitted.

Another approach for reducing the false positives is based on the typical geometry of the infarcted region. Unlike artifacts, infarct regions do not tend to have straight, long and thin or sharp and small geometry but rather a continuous and smooth shape since they occur in the territory of a diseased coronary artery distal to an occlusion or severe stenosis. Therefore, a spatial evaluation of the classified voxels can be performed to remove small isolated regions below a predefined threshold which are likely to be artifacts.

The above described acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

For explanatory purposes, the above is described in connection with CT. However, the approach described herein can also be utilized with other imaging modalities such as MRI, PET, SPECT, and/or other modalities. The approach described herein can also be employed with echocardiography using specialized contrast agents to identify and size perfusion defects.

The approach described herein can be employed for various applications. For example, the approach described herein can be used to automatically identify and quantify perfusion defects in the myocardium from CT studies. In another instance, the approach can be used in detection and quantification of myocardial delayed enhancement. In this case the algorithm would search for voxels with increased rather than decreased CT numbers.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A method for classifying tissue as normal or abnormal tissue based on volumetric image data, comprising:

obtaining segmented volumetric image data for predetermined tissue of interest;

generating, with a processor, a 2D voxel representation of the segmented volumetric image data, wherein the 2D voxel representation is based on de-noised voxels and voxel normalized distances, and takes into account a normal tissue perfusion gradient; and classifying, with the processor, voxels of the segmented volumetric image data as corresponding to abnormal and normal tissue based on the 2D voxel representation.

2. The method of claim 1, further comprising:

de-noising the voxels numbers using an edge preserving smoothing filter.

3. The method of claim 1, further comprising:

normalizing the voxel distances from a region of the endocardium based on a myocardium width.

4. The method of claim 1, further comprising:

identifying voxels as normal and abnormal according to a weighted combination of a percentage of abnormal voxels and subendocardial to subepicardial voxel density difference.

5. The method of claim 1, wherein the classification includes dimensional reduction using principle component analysis.

6. The method of claim 5, further comprising:

fitting a Gaussians mixture model to the 2D voxel representation.

7. The method of claim 6, further comprising:

fitting a Gaussians mixture model using a non-linear optimization, including a Genetic algorithm.

8. The method of claim 1, further comprising:

processing classifications of defects to distinguish between true defects and artifacts.

9. The method of claim 8, wherein determining voxel gradients;

identifying a defect as a true defect when the corresponding voxel gradient has a positive slope; and identifying the defect as artifact when the corresponding voxel gradient has a negative slope.

10. The method of claim 9, wherein the gradient is a transmural gradient from subendocardium to subepicardium.

11. A system, comprising:

a tissue classifier that generates a 2D voxel representation of reconstructed volumetric image data and classifies voxels of the reconstructed volumetric image data as corresponding to abnormal and normal tissue based on the 2D voxel representation, wherein the 2D voxel representation is based on de-noised voxels and voxel normalized distances, and takes into account a normal tissue perfusion gradient.

12. The system of claim 11, wherein the tissue classifier classifies voxels according to a weighted combination of a percentage of abnormal voxels and subendocardial to subepicardial voxel density difference.

13. The system of claim 11, wherein the tissue classifier identifies classifications of defects as true defects when a transmural gradient from subendocardium to subepicardium voxel has a positive slope.

14. The system of claim 11, wherein the tissue classifier identifies classifications of defects as artifacts when a transmural gradient from subendocardium to subepicardium voxel has a negative slope.

15. The system of claim 11, wherein the tissue classifier identifies classifications of defects as artifacts when a transmural gradient from subendocardium to subepicardium voxel has an indistinct pattern.

16. The system of claim 11, wherein the tissue classifier identifies classifications as false positives based on a predefined threshold.

17. A computer readable storage medium encoded with computer executable instructions, which, when executed by a processor of a computer, cause the processor to:

classify tissue as normal and abnormal based on a classification of voxels of volumetric image data corresponding to the tissue, wherein the classification is based on an analysis of a 2D voxel representation, wherein the 2D voxel representation is based on de-noised voxels and voxel normalized distances, and takes into account a normal tissue perfusion gradient.

* * * * *